United States Patent [19]
Treatch

[11] Patent Number: 6,029,048
[45] Date of Patent: Feb. 22, 2000

[54] REPEATER SYSTEM HAVING REDUCED POWER LOSS

[76] Inventor: James E. Treatch, 4312 E. Brooktree La., Dallas, Tex. 75287

[21] Appl. No.: 08/808,238

[22] Filed: Feb. 28, 1997

[51] Int. Cl.[7] .............................. H04Q 7/20; H04Q 7/00
[52] U.S. Cl. .............................. 455/7; 455/11.1; 455/13.3
[58] Field of Search .............................. 455/7, 11.1, 561, 455/562, 127, 19, 103, 14, 16, 13; 370/315; 379/338, 340

[56] References Cited

U.S. PATENT DOCUMENTS

| | | | |
|---|---|---|---|
| 5,432,838 | 7/1995 | Purchase et al. | 455/523 |
| 5,533,011 | 7/1996 | Dean et al. | 455/276.1 |
| 5,758,287 | 5/1998 | Lee et al. | 455/432 |
| 5,802,173 | 9/1998 | Hamilton-Piercy | 455/561 |
| 5,809,395 | 9/1998 | Hamilton-Piercy et al. | 455/4.1 |

*Primary Examiner*—William G. Trost
*Assistant Examiner*—Jean A. Gelin
*Attorney, Agent, or Firm*—Paul F. Wille

[57] ABSTRACT

A repeater system includes a plurality of repeaters, a low level combining circuit, and a tower unit for attachment to an antenna tower. The tower unit includes a linear amplifier, duplexer, filter, and low noise amplifier. The repeaters do not have final amplifiers. Instead, the low level combining circuit couples the signals from each repeater to the tower unit. The output from the linear amplifier in the tower unit is coupled to an antenna over a relatively short cable.

6 Claims, 2 Drawing Sheets

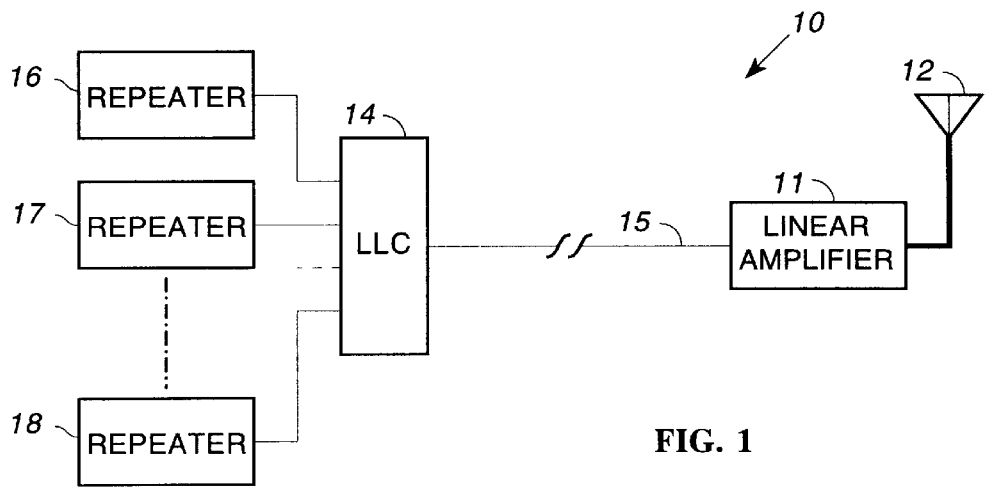
FIG. 1
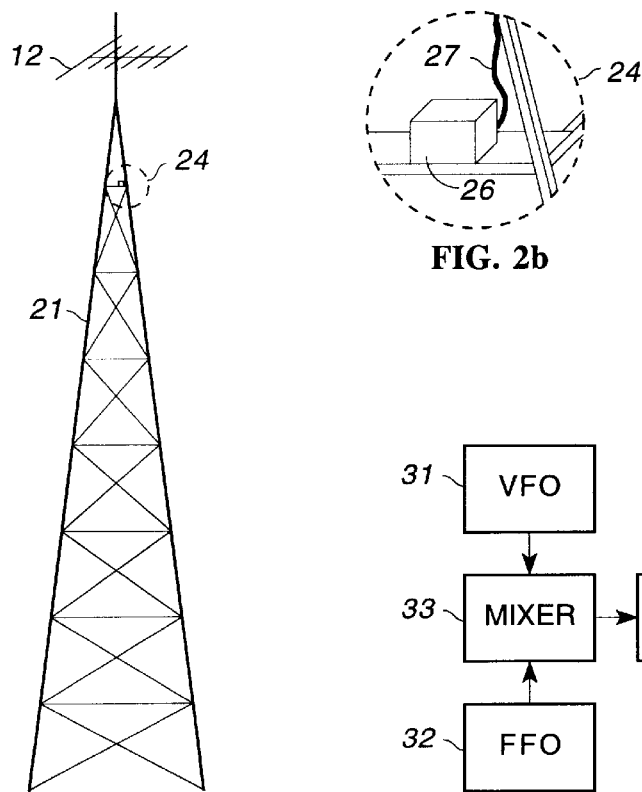
FIG. 2b
FIG. 2a
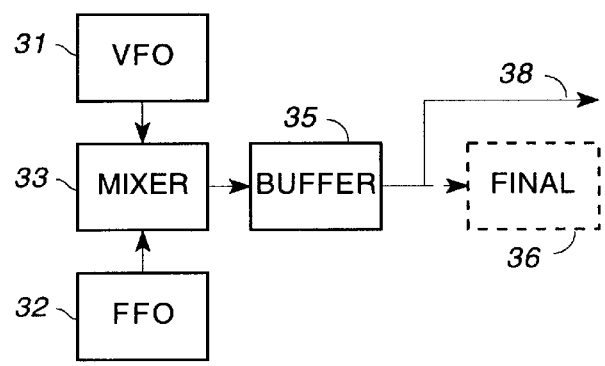
FIG. 3

6,029,048

REPEATER SYSTEM HAVING REDUCED POWER LOSS

BACKGROUND OF THE INVENTION

This invention relates to a repeater system for enabling fixed or mobile radio stations to communicate with each other and, in particular, to a repeater system having reduced power loss.

A repeater is the combination of a receiver and a transmitter in a single unit for receiving a signal at one frequency and simultaneously re-transmitting the same signal on a second frequency. Depending upon application, the transmitted frequency may be relatively close to the received frequency, e.g. 600 khz., or greatly displaced from the received signal. Depending upon application, frequency, and government regulation, the transmitter in a repeater may be relatively powerful, hundreds of watts, or may be rated at just a few watts.

Commercial two-way radio communication has evolved into two different techniques for mobile operation, cellular and specialized mobile radio (SMR) or dispatch service. Cellular systems use several repeaters dispersed in a geographic area and operating at low power to keep propagation relatively short, e.g. within a radius of less than ten miles. The local area covered by each repeater overlaps the local areas covered by neighboring repeaters, forming overlapping "cells" of coverage. A subscriber traveling from one cell to another cell is automatically switched from one repeater to another by a computer coupled to the repeaters by microwave link, optical fiber, or wire.

SMR uses a relatively powerful repeater, compared to cellular systems, and the repeater is usually located at the highest available elevation in a geographic area. The repeater is coupled to an omni-directional antenna to cover the entire geographic area, enabling dispatchers to communicate with a fleet of mobile subscribers in the geographic area and enabling the subscribers to communicate with each other.

At an antenna site, a plurality of repeaters are located in a suitable structure and are coupled to one or more antennas on a tower several yards away. Each repeater operates on a particular pair of frequencies and is a complete receiver/transmitter in itself. A tower may be one hundred to five hundred feet high. The cable coupling the antenna to the repeaters, even low loss cable, has an attenuation of at least three db (decibels) per one hundred feet. As a result, the power actually reaching the antenna is considerably less than that produced by the final amplifier in each repeater.

It is known in the art to locate a Class C amplifier in an antenna tower to reduce cable losses. Adding such an amplifier to a repeater system is not possible because of the plurality of channels in use and the relatively high intermodulation distortion of Class C amplifiers.

In view of the foregoing, it is therefore an object of the invention to reduce power loss in repeaters.

Another object of the invention is to increase the effective radiated power of repeaters in a multi-channel communication system.

A further object of the invention is to reduce the cost of communication systems using a plurality of repeaters.

SUMMARY OF THE INVENTION

The foregoing objects are achieved in this invention in which a repeater system includes a plurality of repeaters, a low level combining circuit, and a tower unit for attachment to an antenna tower. The tower unit includes a linear amplifier, duplexer, filter, and low noise amplifier. The repeaters do not have final amplifiers. Instead, the low level combining circuit couples the signals from each repeater to the tower unit. The output from the linear amplifier in the tower unit is coupled to an antenna over a relatively short cable.

BRIEF DESCRIPTION OF THE DRAWINGS

A more complete understanding of the invention can be obtained by considering the following detailed description in conjunction with the accompanying drawings, in which:

FIG. 1 is a block diagram of a repeater system constructed in accordance with a preferred embodiment of the invention;

FIG. 2A illustrates the location of the tower unit on an antenna tower;

FIG. 2B is a detail of FIG. 2A.

FIG. 3 is a block diagram of the transmitter portion of a repeater constructed in accordance with one aspect of the invention;

DETAILED DESCRIPTION OF THE INVENTION

Figure 4:
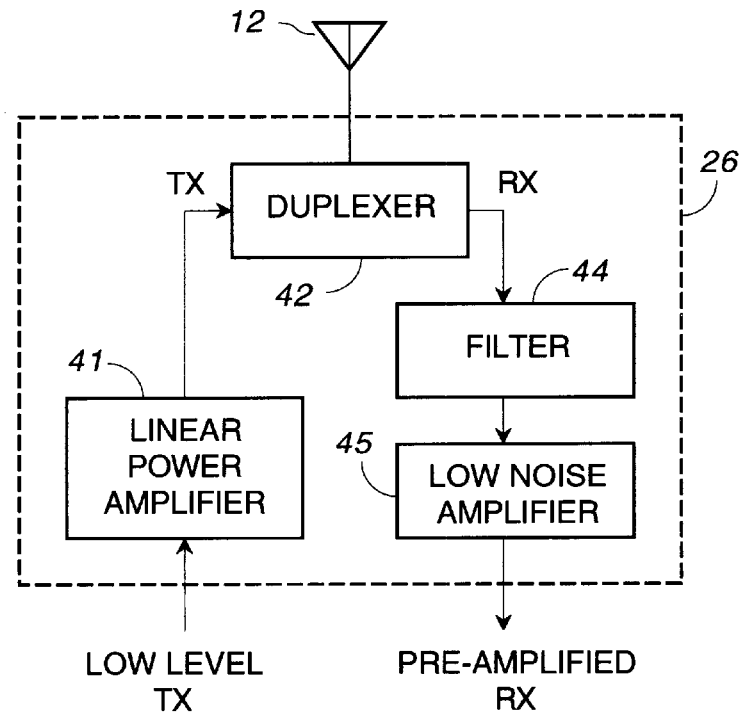
FIG. 4 is a block diagram of a tower unit constructed in accordance with a preferred embodiment of the invention.

FIG. 1 is a block diagram of a repeater system constructed in accordance with a preferred embodiment of the invention. Repeater system 10 includes linear amplifier 11 coupled to antenna 12. Linear amplifier 11 is driven by low level combining circuit 14, which is located at some distance from amplifier 11 and is coupled to amplifier 11 by coaxial cable 15. Combining circuit 14 is coupled to a plurality of repeaters represented by repeater 16 and repeaters 17 through 18. Low level combining circuit 14 couples the output signal from each repeater to coaxial cable 15 and isolates each repeater from all the other repeaters.

In accordance with the invention, as illustrated in FIGS. 2A and 2B, linear amplifier 11, and some ancillary apparatus is located in a suitable housing near the top of an antenna tower. Tower 21 includes a suitable platform, illustrated in greater detail by inset 24, to which is attached tower unit 26. Tower unit 26 encloses linear amplifier 11, which is coupled to antenna 12 by cable 27. Because cable 27 is carrying the power output signal from the final amplifier stage, a high quality, low loss, coaxial cable is used. In accordance with the invention, cable 27 is relatively short and is much shorter than cable 15 (FIG. 1), which carries a low power signal from combining circuit 14. As used herein, "low power" means a signal having a power of about one watt or less.

In the prior art, each repeater includes a power amplifier and several of such repeaters share a single antenna. In accordance with the invention, a single linear amplifier serves several repeaters thereby reducing the cost of each repeater and permitting one to use low level combining, thereby further reducing cost and reducing noise in the system. The linear amplifier must be very linear, characterized by intermodulation distortion of −60 to −80 dbc (decibels below carrier). Although such amplifiers are more expensive than the power amplifier in a typical repeater, which is characterized by intermodulation distortion of −40 dbc., the increase in cost is more than offset by the fact that there is only one power amplifier.

FIG. 3 is a block diagram of the transmitter portion of a repeater. The output from variable frequency oscillator 31 and the output from fixed frequency oscillator 32 are combined in mixer 33 and coupled to buffer amplifier 35. In the prior art, the output of buffer amplifier 35 is coupled to final amplifier 36. In accordance with the invention, the output of buffer amplifier 35 is coupled to output 38 as one input to low level combining circuit 14 (FIG. 1).

FIG. 4 illustrates the contents of tower unit 26 in greater detail. Specifically, tower unit 26 includes linear power amplifier 41 coupled through duplexer 42 to antenna 12. Signals received by antenna 12 are coupled through duplexer 42 and filter 44 to low noise amplifier 45. Thus, the input to tower unit 26 is a low level transmission signal and the output from the tower unit is a preamplified received signal. Duplexer 42 isolates linear power amplifier 41 from filter 44 and low noise amplifier 45.

In operation, a signal from linear amplifier 11 is reduced relatively little because of the short length of cable 27 (FIG. 2), thereby increasing the effective radiated power of the system. For example, in a repeater system constructed in accordance with the invention using a tower having a nominal height of one hundred feet, the transmitted signal is at least 3 db. stronger than in systems of the prior art. Alternatively, a lower power linear amplifier can be used to produce the same radiated power, thereby saving power and reducing operating costs.

Figure 5:
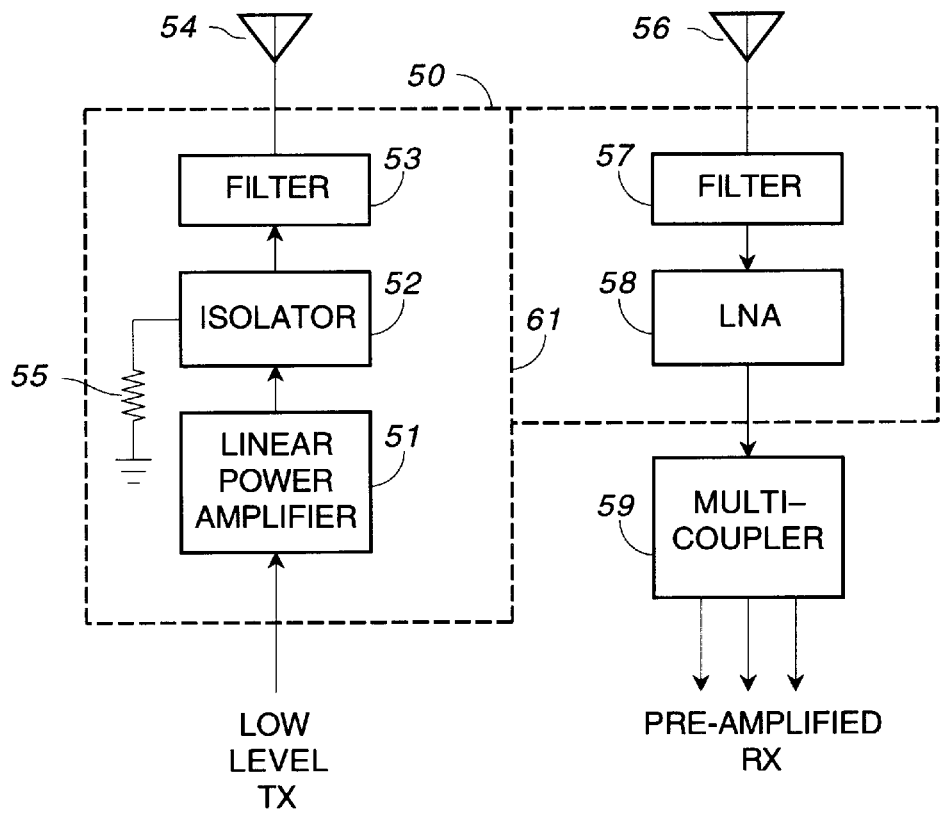
FIG. 5 is a block diagram of a tower unit constructed in accordance with an alternative embodiment of the invention.

FIG. 5 illustrates an alternative embodiment of a tower unit in which separate antennas are used for transmitting and receiving signals. Tower unit 50 includes linear power amplifier 51 coupled through isolator 52 and filter 53 to antenna 54. Isolator 52 couples signals from amplifier 51 directly to filter 53. Signals received by antenna 54 are diverted by isolator 52 through a suitable low, matching load impedance to ground, represented by resistor 55. Linear amplifier 51 is preferably characterized by an intermodulation distortion of 60 dbc., or less. Antenna 56 is coupled through filter 57 and low noise amplifier 58 to multi-coupler 59, which separates the signal into a plurality of paths for driving several repeaters. Multi-coupler 59 can be located in tower unit 50 or located physically near the repeaters. Tower unit 50 preferably includes a single enclosure separated into transmitting and receiving sections by divider 61. Alternatively, separate enclosures can be used.

There is thus provided a low loss repeater system that increases the effective radiated power of repeaters in a multi-channel communication system. The combination also reduces the cost of communication systems using a plurality of repeaters.

Having thus described the invention, it will be apparent to those of skill in the art that various modifications can be made within the scope of the invention. For example, the tower unit includes suitable protection and shutdown devices (not shown) for minimizing damage due to lightning strikes or other difficulties. The tower unit can be supplied with AC line voltage or with low voltage DC. Suitable power supplies and protection devices are well known per se in the art. Although described in conjunction with a tower, it is understood that an antenna can be mounted on a tall building or other structure instead. Although illustrated in FIG. 2 as driving a Yagi antenna, any type of antenna can be used with the invention, e.g. omnidirectional, fixed beam, rotating beam (physically moving the antenna to move the beam), scanning beam (electrically moving the beam), or combination thereof. Variable frequency oscillator 31 can be a manually or electrically tunable oscillator, a programmable oscillator, or a phase locked loop circuit.

What is claimed as the invention is:

1. A repeater system comprising:

a plurality of repeaters, wherein each repeater lacks an output power amplifier;

a tower unit adapted for attachment to an antenna tower, wherein said tower unit includes a linear power amplifier;

a low level combining circuit coupled between said repeaters and said linear power amplifier, wherein said low level combining circuit is physically near the plurality of repeaters and remote from said tower unit.

2. The repeater system as set forth in claim 1 wherein said tower unit further includes:

a duplexer having one input coupled to said linear amplifier, a first output adapted to be coupled to an antenna, and a second output;

a low noise amplifier coupled to said second output.

3. The repeater system as set forth in claim 2 and further including:

a filter coupled between said second output and said low noise amplifier.

4. The repeater system as set forth in claim 1 wherein said tower unit further includes:

an isolator having an input coupled to said linear power amplifier and an output; and a first filter coupled to the output of said isolator and adapted to be coupled to a transmitting antenna.

5. The repeater system as set forth in claim 4 wherein said tower unit further includes:

a second filter adapted to be coupled to a receiving antenna; and a low noise amplifier coupled to said second filter.

6. The repeater system as set forth in claim 5 and further including:

a multi-coupler coupled to said low noise amplifier.

* * * * *